3,353,600
METHOD FOR PLUGGING PERFORATIONS
Max R. Annis and Fred A. Brooks, Jr., Houston, Tex., assignors to Esso Production Research Company, a corporation of Delaware
No Drawing. Filed Feb. 10, 1966, Ser. No. 526,406
10 Claims. (Cl. 166—22)

This invention is concerned with the plugging of perforations and similar openings in oil and gas wells.

The completion and workover of oil and gas wells often requires the plugging of perforations, screens and similar openings. This can be done by suspending graded particles of calcium carbonate, aluminum or a similar dissolvable material in a viscous liquid, injecting this liquid into the well in a quantity sufficient to plug the perforations or other openings, and thereafter restoring communication between the well and the surrounding formation by injecting an acid or base solution to dissolve the plugging material. Experience has shown that difficulties in dissolving the particles plugging the perforations or other openings are sometimes encountered. This is apparently due to poor contact between the acid or base and the plugging particles. The viscous liquids employed are not readily displaced by the later injected acid or base solution and hence the particles dissolve very slowly. This restricts application of the method and often necessitates resort to other plugging techniques.

It has now been found that difficulties of the type outlined above can be avoided by suspending the particles of calcium carbonate or other dissolvable material in a viscous emulsion which will break after a predetermined time at the formation temperature. Tests have shown that the use of such an emulsion facilitates displacement of the initial carrier fluid through interstices between the plugging particles and thus makes possible rapid contact between the acid or base and the dissolvable material. This in turn permits the rapid restoration of communication between the well bore and surrounding formation after the operations requiring temporary plugging have been completed.

The emulsions employed for purposes of the invention are preferably oil-in-water emulsions which are stable at ordinary atmospheric temperatures but will break of their own accord after predetermined periods at elevated temperatures. Such emulsions can be prepared by dispersing oil in water in the presence of a surface active agent which distributes itself between the oil and water phases to stabilize the emulsion at atmospheric temperatures but behaves differently at higher temperatures because of a change in distribution between the two phases. Tests have shown that suitable emulsions can be prepared with a variety of different surface active agents but that materials having an inverse solubility-temperature relationship in the aqueous phase are particularly effective. The time required for breaking of these emulsions at a particular temperature, or alternatively the temperature at which the emulsions will break within a given time, can be varied over a broad range by varying the surface active agents employed and the concentrations in which they are used. Such emulsions can be readily prepared with little agitation and can be mixed in advance and stored for several days if desired.

The preferred surface active agents for use in preparing the temperature-sensitive emulsions referred to above are nonionic compounds or mixtures of such compounds with anionic surface active agents. Suitable nonionic agents include the alkyl phenol polyethylene glycol ethers having alkyl groups containing from about 6 to about 10 carbon atoms and including from about 8 to about 40 moles of ethylene oxide per mole of alkyl phenol, substituted sorbitans containing from 1 to 3 long chain $C_8$ to $C_{24}$ aliphatic ester groups or polyoxyethylated ester groups, ethylene oxide adducts of polyproxylated ethylenediamines, condensation products of ethylene oxide with hydrophobe bases prepared by the reaction of propylene oxide with propylene glycol, polyoxyethylated alkyl esters, and mixtures of such compounds. These and other nonionic surfactants may be employed in combination with long chain alkyl or alkaryl sodium sulphates and similar anionic surface active agents if desired. The nonionic compounds may also be utilized in some cases in combination with long chain substituted quaternary ammonium compounds and other cationic surface active agents.

The surface active agent or combination of agents selected for purposes of the invention is preferably employed in conjunction with a water-soluble salt of lignosulfonic acid such as sodium lignosulfonate, calcium lignosulfonate, aluminum lignosulfonate, ferrochrome lignosulfonate or ammonium chrome lignosulfonate. These materials act as film strengtheners and thus tend to increase the time period required for the breaking of the emulsions under given temperature conditions.

It will be understood that the invention is not restricted to the use of surface active agents selected from the specific classes set forth above and may instead be carried out with any surfactant which is an effective emulsifier at normal atmospheric temperatures and becomes ineffective at somewhat higher temperatures. The distribution coefficients and other properties of surface active agents vary with changes in the number and placement of the hydrophilic and hydrophobic groups on the molecule and hence all of the materials described above are not equally effective. The suitability of a particular compound for purposes of the invention will depend in part on the temperature conditions and concentrations in which it is to be used. In general, the total surface active agent concentration will range from about 0.5 to about 10% by weight. The use of from about 0.5 to about 4% by weight of an alkyl phenol polyalkylene glycol ether and from about 1 to about 5% by weight of a water-soluble salt of lignosulfonic acid is preferred.

The emulsions used for suspending the particles of calcium carbonate or other dissolvable material can be prepared by dispersing crude oil, diesel fuel, kerosene, heating oil or a similar hydrocarbon oil in water or brine to which the surface active agent or mixture of a surface active agent and salt of lignosulfonic acid has been added. This may be done by circulating the liquids through a pump or by means of conventional mixing equipment. The relative quantities of oil and water or brine employed will depend in part on the viscosity required to suspend the particles of calcium carbonate or other dissolvable material. The plugging of relatively large perforations normally requires the use of somewhat larger particles than may be necessary to close off small openings and hence a more viscous carrier fluid will generally be employed where the perforations or other openings are relatively large. In general, viscosities sufficient to give settling rates less than about 5 feet per hour are preferred. The viscosity can be readily adjusted by varying the amount of oil used in the internal phase of the emulsion. The more oil employed, the greater the viscosity will be. The oil content will normally range from about 3 to about 10 volumes per volume of water. The use of emulsions containing from about 5 to 7 volumes of oil per volume of water has been found to be particularly effective for plugging ⅜" perforation with calcium carbonate particles up to ¼" in size.

It is generally preferable to employ an oil field brine for preparing the emulsion or to add salts to the aqueous phase in a concentration sufficient to simulate such a brine. The presence of the salts avoids fresh water damage to the producing formations with which the emulsion may come in contact. The addition of sodium chloride in a concentration from about 1% to about 6% by weight and calcium chloride in a concentration of from about 0.1 to about 2% by weight is generally satisfactory. Water soluble sodium and calcium compounds other than the chlorides may be employed in similar concentrations if desired. The presence of salts in relatively high concentrations may in some cases reduce the time required for breaking of the emulsion.

The particles of calcium carbonate, aluminum or other dissolvable material suspended in the emulsion will normally range between about 200 Tyler mesh and about ⅜" in size. As pointed out earlier, the upper size limit will depend somewhat upon the size of the perforations or other openings to be plugged and may be varied. The material used should generally be graded by weight so that 20 to 30% of the particles are between about 40 and about 200 Tyler mesh, about 40 to 60% are between about 40 mesh and 4 mesh, and the remaining 20 to 30% are greater than 4 mesh in size. The graded particles can be added to the emulsion at the time it is prepared or may be added later. The latter procedure is generally preferred to avoid circulating the particles through the pump used to prepare the emulsion. The graded particles will ordinarily be suspended in the emulsion in a concentration from about 50 to 250 pounds per 42 gallon barrel.

In utilizing the sealing fluid prepared as described above, the temperature-sensitive emulsion containing the suspended particles of calcium carbonate or other dissolvable solid is first pumped into the well in a quantity sufficient to plug the perforations or other openings in the wellbore. The emulsion should be formulated so that the breaking time under wellbore temperature conditions exceeds the time normally required to carry out the operation necessitating temporary plugging of the perforations. The volume of fluid needed will depend upon the number of perforations or other openings and their spacing. From 2 to about 10 barrels of emulsion will be sufficient for most temporary plugging operations. After an increase in pressure within the wellbore indicates that plugging has taken place, the contemplated workover or completion operations may be carried out. After completion of these operations, an acid or base solution is injected into the wellbore to dissolve the plugging material. The solution utilized will depend upon the particular dissolvable material employed. It is preferred to employ particles of calcium carbonate and later dissolve these with a solution of hydrochloric or acetic acid but either acids or bases may be used with aluminum particles and certain other solids. The solution can be injected immediately or may be introduced after sufficient time for the emulsion to break has elapsed.

If solution is injected immediately, it will not displace the viscous fluid occupying the pore spaces between the particles until the emulsion breaks. Once this occurs, the oil and water flow from the pore spaces into the perforations or other openings and are lost to the formation. This permits entry of the acid or base solution into the pore spaces and thus facilitates contact between the solution and the plugging material. As the material dissolves, communication with the formation is restored. This avoids the necessity for backflowing the well to restore communication and thus eliminates problems that may be encountered when other temporary plugging techniques are used.

The invention can be further illustrated by referring to the results of laboratory and field tests set forth in the following examples.

*Example 1.*—A laboratory test of the use of graded calcium carbonate particles for the sealing of perforations was carried out in 2" tubing containing ⅜" holes. The particles employed varied from 200 Tyler mesh up to ¼" in size. These were suspended in a stable, high viscosity emulsion of kerosene in salt water which had been formulated for use in conventional oil field workover operations. On pumping this emulsion into the tubing, it was found that calcium carbonate particles quickly bridged over and filled the ⅜" holes. Substantially no leakage occurred at differential pressures up to 1000 lbs. per square inch, the upper limit of the test apparatus.

Glacial acetic acid was then injected into the tubing behind the emulsion to dissolve the calcium carbonate particles and thus restore communication through the openings in the tubing wall. After several hours, it was found that the acetic acid solution had penetrated only a few inches into the emulsion and that the particles were therefore essentially unaffected by the acid. Similar results were obtained with a solution of concentrated hydrochloric acid. Again the acid did not displace the viscous emulsion and hence the particles were not dissolved.

Following the test described above, a second test was carried out with a temperature-sensitive, time-breaking emulsion. The emulsion utilized contained six volumes of diesel oil per volume of water, 5% by weight of sodium chloride, 0.5% by weight of calcium chloride, 2.25% by weight of a nonyl phenol polyethylene glycol ether containing 10.5 moles of ethylene oxide per mole of nonyl phenol, and 3% by weight of calcium lignosulfonate. Graded particles of calcium carbonate were suspended in this emulsion in a concentration of 2.73 lbs. per gallon. The composition of the graded particles was as follows:

| Size: | Percent |
| --- | --- |
| 40–200 mesh | 26 |
| 30–50 mesh | 17 |
| Xo | 9 |
| Z | 9 |
| No. 1 | 17 |
| 4 mesh to ¼" | 22 |

The tests showed that the emulsion containing the graded calcium carbonate effectively plugged the ⅜" diameter holes. Essentially no leakage took place under a differential pressure of 1000 lbs. per square inch during four hours at room temperature. When the system was heated to a temperature between 140 and 150° F., the emulsion broke and oil began flowing out of the holes after about two hours.

Test tube experiments with the emulsion containing the nonyl phenol polyethylene glycol ether and calcium lignosulfonate showed that the emulsion loosened after about two hours with very little separation of oil and water but with an immediate reduction in viscosity. Acetic acid introduced at this point immediately flowed through the emulsion to the bottom of the system. In the absence of the acid, the emulsion later took on a "clabbered" appearance. Acid introduced at this latter point would completely break the emulsion, allowing the oil and water to separate. In either case acid in contact with the emulsion after it started breaking quickly displaced the carrier liquid to permit contact with the calcium carbonate particles.

The results of the tests described above show that particles of calcium carbonate or similar material which are utilized to plug perforations cannot be readily dissolved if suspended in a stable emulsion. By employing an emulsion which will break of its own accord after a predetermined time at formation temperature, difficulties in securing effective contact between the particles and the later injected acid or base solution can be avoided.

*Example 2.*—Several emulsions were prepared and tested to determine their breaking times at various temperatures. In each case the emulsion contained six volumes of diesel oil dispersed in one volume of water to produce an oil-in-water emulsion. The emulsion compositions, the temperatures at which the emulsions were tested, and the breaking times are shown in the following table.

TABLE I.—EMULSION BREAKING TESTS

| Emulsion Composition [1] | Temperature, deg. F. | Breaking Time |
| --- | --- | --- |
| 5% NaCl, 0.5% CaCl₂, 2% surface active agent A. | 140 | 20 minutes. |
| 5% NaCl, 0.5% CaCl₂, 2% surface active agent A, 3% calcium lignosulfonate. | 140 | 2½ hours. |
| | 145 | 1½ hours. |
| | 150 | 26 minutes. |
| 5% NaCl, 0.05% CaCl₂, 2% surface active agent B, 3% calcium lignosulfonate. | 160 | 1¾ hours. |
| | 170 | |
| 5% NaCl, 0.5% CaCl₂, 1% surface active agent A, 1% surface active agent B, 3% calcium lignosulfonate. | 150 | 2¼ hours. |
| | 160 | 45 minutes. |
| 5% NaCl, 0.5% CaCl₂, 1.3% surface active agent A, 0.7% surface active agent B, 3% calcium lignosulfonate. | 150 | 1¾ hours. |
| 5% NaCl, 0.5% CaCl₂, 0.7% surface active agent A, 1.3% surface active agent B, 3% calcium lignosulfonate. | 156 | 1 hour and 50 minutes. |
| 5% NaCl, 0.5% CaCl₂, 2% surface active agent C, 3% calcium lignosulfonate. | 183 | 1½ hours. |
| 5% NaCl, 0.5% CaCl₂, 1% surface active agent B, 1% surface active agent C. | 170 | 2¼ hours. |

[1] All composition percentages based on aqueous phase.

Surface Active Agent A=Nonyl phenol polyethylene glycol ether containing 10.5 moles of ethylene oxide per mole.

Surface Active Agent B=Nonyl phenol polyethylene glycol ether containing 13 moles of ethylene oxide per mole.

Surface Active Agent C=Nonyl phenol polyethylene glycol ether containing 15 moles of ethylene oxide per mole.

The data set forth in Table I demonstrate that emulsions which will break of their own accord after periods of from about 20 minutes to 2½ hours at temperatures in the range between about 140° F. and about 170° F. can be readily prepared by selecting the proper surface active agents and varying concentrations in which such agents are used. Longer breaking periods, particularly at higher temperatures, can be obtained by employing these and other surface active agents in somewhat higher concentrations. This makes possible the formulation of emulsions which will retain their viscosities for periods sufficiently long to permit the completion of a variety of different workover or completion operations but which will break after predetermined periods at formation temperature to permit the dissolving of particles of calcium carbonate or a similar dissolvable material with a subsequently introduced acid or base solution.

*Example 3.*—Further tests were carried out in a pipe string including a perforated nipple of the type used at the bottom end of the production string in offshore and gas wells. The perforations in the nipple were ⅜″ in diameter and were located below an 8″ section of ¾″ tubing representing a storm choke in the tubing string. The emulsion employed was prepared by mixing 18 gallons of fresh water, 108 gallons of diesel oil, 4½ lbs. of calcium lignosulfonate, and 0.4 of gallon of a nonyl phenol polyethylene glycol ether containing 10.5 moles of ethylene oxide per mole. These constituents were mixed in a small blender used in oil field cementing operations. Graded calcium carbonate was added to two barrels of this emulsion as follows:

| Size: | Amount, lbs. |
| --- | --- |
| 40–200 mesh | 59 |
| 30–50 mesh | 39 |
| Xo | 20 |
| Z | 20 |
| No. 1 | 60 |
| ¼″ | 80 |

The emulsion containing the suspended particles of calcium carbonate was then pumped through the pipe string into the perforated nipple by means of an oil field pump truck. A seal developed quickly. The pressure was raised to 600 lbs. per square inch and held for five minutes without any indication of appreciable leakage. The system was then raised to successively higher pressures and held at each pressure level for five minutes. It was found that some leakage occurred each time the pressure was raised because of the surge pressures developed in the pump but that the perforations quickly resealed so that serious leakage did not take place. A final pressure of 1750 lbs. per square inch was recorded without failure of the seal. Due to the surge pressures, the differential pressure across the plugging material was actually in excess of 2,000 lbs. per square inch at times.

Following the pressure test described above, the pipe string was heated to formation temperatures. Hydrochloric acid introduced into the pipe string above the perforations after the emulsion had broken quickly contacted the calcium carbonate particles bridged across the perforations, dissolving the particles and restoring communication. No difficulties due to plugging of the ¾″ tubing representing the storm choke were encountered. These results again demonstrate that particles of calcium carbonate or a similar dissolvable material can be suspended in time-breaking, temperature-sensitive emulsion for the plugging of perforations and other openings in oil and gas wells and later removed by treating the wells with an acid or base solution after the emulsion has broken.

What is claimed is:

1. A method for the temporary plugging of perforations or similar openings in an oil or gas well which comprises:
   (a) adding graded particles of a dissolvable solid plugging agent to a temperature-sensitive, time-breaking oil-in-water emulsion of sufficient viscosity to suspend said particles, said emulsion being stable at normal atmospheric temperatures and having a predetermined breaking time at the formation temperature in said well;
   (b) injecting said emulsion containing the suspended particles into said well in a quantity sufficient to plug the perforations or other openings therein; and
   (c) thereafter injecting a liquid in which said particles are soluble into said well in a quantity sufficient to dissolve the particles plugging said perforations or other openings after sufficient time for the breaking of said emulsion has elapsed.

2. The method defined by claim 1 wherein said emulsion contains from about 0.5 to about 10% by weight of a nonionic surface active agent.

3. The method defined by claim 2 wherein said emulsion includes from about 1 to about 5% by weight of a water-soluble salt of lignosulfonic acid.

4. The method defined by claim 2 wherein said surface active agent is an alkyl phenol polyalkylene glycol ether.

5. The method defined by claim 1 wherein said dissolvable solid is calcium carbonate.

6. The method defined by claim 1 wherein said emulsion contains a surface active agent having an inverse temperature-solubility relationship in the aqueous phase.

7. The method defined by claim 1 wherein said emulsion contains from about 3 to about 10 volumes of a hydrocarbon oil per volume of water.

8. The method defined by claim 1 wherein the aqueous phase of said emulsion is a brine containing from about 1 to about 6 weight percent of a water-soluble sodium salt and from 0.1 to about 2 weight percent of a water-soluble calcium salt.

9. The method defined by claim 1 wherein said liquid in which said particles are soluble is injected into said well prior to the breaking of said emulsion.

10. The method defined by claim 1 wherein said emulsion contains a mixture of nonionic and ionic surface active agents.

References Cited

UNITED STATES PATENTS

| | | | |
|---|---|---|---|
| 2,681,889 | 6/1954 | Menaul et al. | 252—8.55 |
| 2,689,009 | 9/1954 | Brainerd et al. | |
| 2,801,218 | 7/1957 | Menaul. | |
| 2,935,129 | 5/1960 | Allen et al. | 166—42 |
| 2,988,142 | 6/1961 | Maly | 166—9 |
| 3,046,222 | 7/1962 | Phansalkar et al. | 166—42 X |
| 3,185,217 | 5/1965 | Brooks et al. | 166—42 |

STEPHEN J. NOVOSAD, *Primary Examiner.*